Feb. 5, 1952

C. H. JACOBSON 2,584,964

FILM ADVANCING MEANS FOR CAMERAS, INCLUDING
FILM PAWLS OR CURTAIN SHUTTERS

Filed June 11, 1947

INVENTOR
CARL H. JACOBSON
BY
ATTORNEYS

Feb. 5, 1952  C. H. JACOBSON  2,584,964
FILM ADVANCING MEANS FOR CAMERAS, INCLUDING
FILM PAWLS OR CURTAIN SHUTTERS
Filed June 11, 1947  2 SHEETS—SHEET 2

INVENTOR
CARL H. JACOBSON
BY
ATTORNEYS

UNITED STATES PATENT OFFICE 2,584,964

FILM ADVANCING MEANS FOR CAMERAS, INCLUDING FILM PAWLS OR CURTAIN SHUTTERS

Carl H. Jacobson, Binghamton, N. Y., assignor to General Aniline & Film Corporation, New York, N. Y., a corporation of Delaware Application June 11, 1947, Serial No. 754,011

3 Claims. (Cl. 95—31)

This invention relates to photographic cameras and, more specifically, to a means for advancing film of perforated type coincidentally with the setting of the camera shutter.

It is an object of the invention to provide coincidental film advancing with the setting of a shutter of the so-called focal plane or curtain type.

It is a further object of the invention to provide for advancing a perforated film such as the usual 35 mm. film in still cameras by an interconnection between one of the shutter curtains and the perforations of the film.

A further object of the invention is that of devising mechanism which will advance the film in cameras of the type described and by shutters of the curtain type and in which all possibility of making unintentional double exposures will be obviated.

A further object of the invention is that of devising film advancing means which shall function in coordination with a curtain type shutter and which shall be fully automatic in engaging the film prior to advancing it from one frame to the next and in disengaging that film prior to release upon starting exposure.

A further object of the invention is that of providing for coincidental film advancing with the setting of the focal plane shutter which shall have no undesired effect after disengagement of the film prior to release, and which shall not in any manner adversely affect the functioning of the shutter during its travel in exposing the film.

Other objects of the invention will be apparent from the following disclosure.

In most cameras of the smaller types, and especially most 35 mm. cameras, it is customary to advance the film at the same time and by the same control mechanism as is employed to set the shutter for an exposure. Most of these devices employ sprockets engageable with the perforated edges of the film and which remain in contact with the film at all times. Since in most of these cameras the shutter setting means and the film advancing sprocket drive remain in interconnected relationship even during exposure, or at least, are so interconnected that movement of some of the elements affect the others, there is a likelihood of the shutter movement causing some slight action at the sprocket and, therefore, a consequent jarring or movement of the film itself. It is highly desirable that the possibility of double exposures be eliminated and heretofore such double exposure preventing devices have necessitated rather complicated additions to a small and intricate mechanism which was already more complicated than is desirable.

As shown and described in United States Patent No. 2,320,441, a very simple means for advancing film involves the use of perforation gripping detents which are moved a distance sufficient to advance the film from one frame to the next; and such means have comprised separate film advancing levers which were not in any way coincidentally connected with the setting of the shutter itself. In other words, they have necessitated the two functions being independently actuated so that the coincidental film advance and shutter setting has not been possible with them.

According to the invention herein described and claimed, a curtain type or so-called focal plane type shutter is employed in its usual manner to time the exposures and, in addition, to advance the film from one supply to a receiving core or cartridge, for example, from one cartridge to another as shown and described in United States Patent No. 2,070,122. The shutter curtain adjacent the film is provided at the reenforced edge of its light admitting aperture with pawls or hook-like instruments which are adapted to engage, through special slots at either side of the film gate, the aligning perforations of the film at the gate. These pawls are under the control of or influenced by, automatically functioning spring baffles which permit the pawls to maintain engagement with the film perforations while the curtain is moved from one position to its opposite extreme position, but which disengage them upon movement in the reverse direction. During setting of the curtain, the pawls which engage the film will move it a corresponding distance or just far enough to advance the film from one frame to the next. These automatic baffles, as will be described in greater detail later, so affect the pawls which are of appropriate shape, to move them out of engagement with the film perforations and to prevent further engagement during the return movement of the curtain as exposure is effected. The lost motion or slight return movement of the curtain after it has been moved to its extreme position during the setting thereof assists in the above-mentioned disengagement.

According to a modification, the invention may be practiced without resort to these special baffles in which event the tension or tautness of the curtains and special design of the pawls is employed to effect engagement and disengagement thereof with the film.

Now referring to the figures of drawing in which like parts are indicated by identical reference numerals, one preferred form and a modification of the invention will be described in greater detail. In the drawings.

Figure 1:
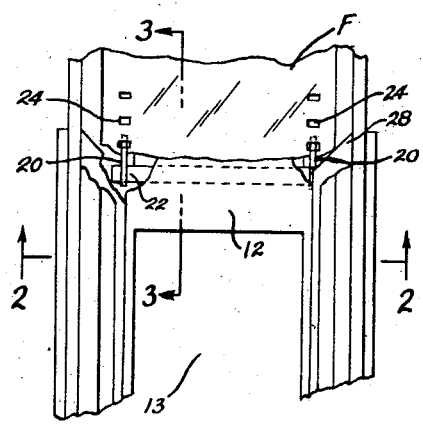
Fig. 1 is a plan view, certain parts being broken away, of a part of the camera mechanism to which the invention has been applied.
Figure 3:
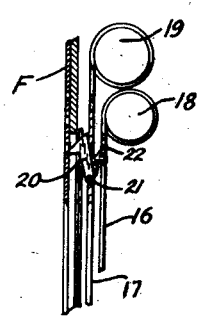
Fig. 3 is a section taken at line 3—3, Fig. 1.
Figure 2:
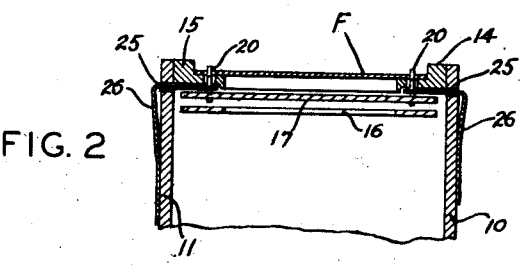
Fig. 2 is a section taken at line 2—2, Fig. 1.

Referring to Figs. 1, 2, and 3, the invention is shown as applied to a camera in which film F is guided through a film gate structure comprising wall members 10 and 11 which extend back from the front of the camera casing and internally thereof to carry the gate plate 12 having the usual rectangular gate opening 13 at either side of which are the guide members 14 and 15 which complete a channel within which the film is confined. While it is not shown here, the camera back would have complementary film engaging means which cooperate with the guide members 14 and 15 and gate plate to prevent film movement toward the back of the camera and which would comprise the usual pressure pad for that purpose.

Figure 4:
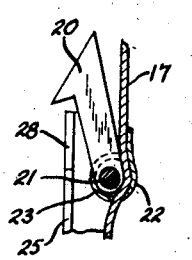
Fig. 4 is a sectional view showing to an enlarged scale the details of one of the film engaging pawls and the method of its attachment to the curtain.
Figure 5:
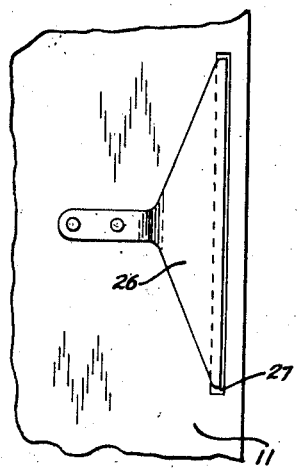
Fig. 5 is an elevation taken at the side of the film gate assembly showing one of the pawl controlling baffles.
Figure 6:
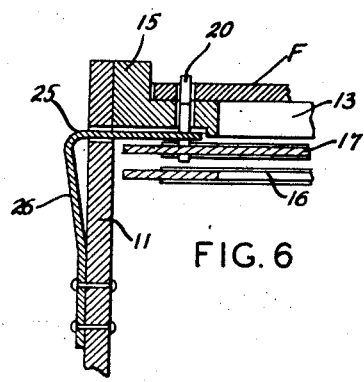
Fig. 6 shows in section and to a greatly enlarged scale, the left-hand side of Fig. 2.

The shutter which is of conventional type and for which a more complete disclosure will be found in United States Patents Nos. 1,980,546 and 2,136,148, comprises, among other elements, a first curtain 16 and a second curtain 17. This designation, first and second, is employed merely since, upon release, the curtain 16 is the first to start its travel across the gate opening. These curtains 16 and 17 are tensioned by and rewound about the usual spring rollers 18 and 19. In these Figures 1, 2, and 3, the parts are shown with the shutter at a position of rest prior to being tensioned. The second curtain 17 blocks off the gate aperture 13 at the position illustrated and carries at the edge of the rectangular shutter opening therein, two hook-like pawls or claws 20 which are pivoted at a hinge pin 21 passing through the reenforcing strip 22. This reenforcing strip 22 merely comprises a thin metal channel which is clinched about the edge of the curtain fabric so as to reenforce it and to maintain its straight edge. The construction is shown more clearly in Fig. 4, the strip 22 having been clinched about the edge of curtain 17 and having a loop 23 within which is pivotally carried the said hinge pin 21 for the claw or pawl 20. These pawls 20, one at either side, engage the perforations 24 in the film F. The tension in the curtain 17 has an effect of urging the pawls toward the film. That assures that the perforations will be engaged prior to movement or just at the start of movement of the curtain toward its set position. As the curtain is moved from the position of Fig. 1 to that of Fig. 7, it is wound about a roller (not shown) and the springs in the spring rollers 18 and 19 are further tensioned so as to impart the necessary rapid movement to the shutter curtains on release.

At either side of the gate structure are provided baffles of thin sheet material and which comprises inwardly directed plates 25 connected to or angularly bent from the spring portions 26 riveted to the wall members 10 and 11 and which tend to urge the plates 25 to the position shown in Figs. 1 and 2. These plates 25 project through suitable narrow slots 27 at the side members 10 and 11. Plates 25 also have beveled ends 28 against which the claw portions of the pawls 20 contact and by means of which the said baffles are cammed outwardly to permit the pawls to pass while still in engagement with the film. During setting the shutter, the tension in the curtain 17 is great enough to maintain engagement between the pawls and the film and to push the baffles outwardly, it being understood that these baffle springs offer very little resistance.

Figure 7:
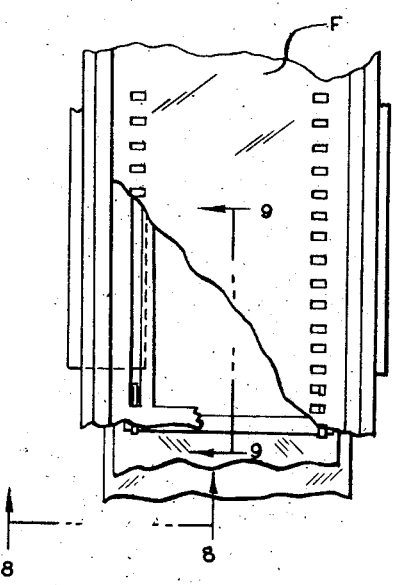
Fig. 7 is a plan view similar to Fig. 1, but showing the parts in the position they occupy after the shutter curtain has been moved to its opposite extreme position.
Figure 9:
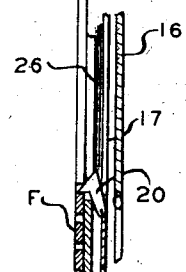
Fig. 9 is a section taken at line 9—9, Fig. 7.
Figure 8:
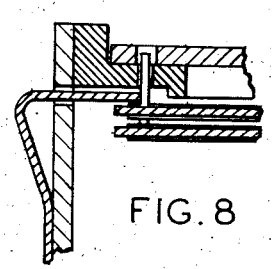
Fig. 8 is a section taken at line 8—8 and greatly enlarged.

Now referring to Figs. 7, 8, and 9, parts are shown in the position they occupy when the shutter curtains have been moved to their extreme position during setting. The movement of the curtain is greater by a small amount than the longest dimension of the gate so that the film is moved slightly more than the length of one picture area thereon. That provides for a small space between the individual scenes. As the second curtain 17 is thus moved, the film is advanced a corresponding distance whereupon at releasing the setting knob or lever, the curtain itself moves backwardly or toward the spring roller 19 until the setting mechanism or winding roller contacts a stop. That movement toward roller 19 effects a disengagement of the pawls 20 with the film, and due to the sloping cam surface 29 and its engagement with the baffles 25, the pawls are forced toward the curtain 17 as illustrated more clearly in the enlarged view, Fig. 10. The ends of the baffles opposite the beveled portions 28 are transversely disposed so that they remain in the position of Figs. 2 and 8 to underlie the slots rather than being cammed outwardly as they are upon movement of the parts in the setting direction. After the pawls pass by the baffles during setting, Figs. 7 and 8, the springs cause them to assume their normal position.

Figure 10:
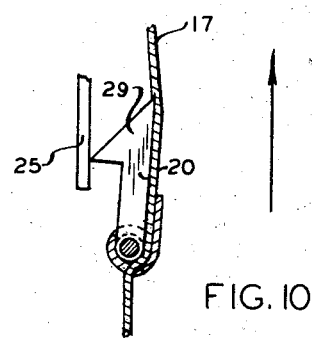
Fig. 10 is a view similar to Fig. 4 but showing the pawl withdrawn from the film by the baffle.

During that time for which the shutter is set, the parts continue in the relationship illustrated in Fig. 10. Upon release of the shutter, the curtain 16 first starts to move and after it has moved a prescribed distance according to the speed setting, the second curtain is released and moved across the gate aperture. During that movement, the points of the pawls bear against the lower side of their respective baffles 25, but that has very little retarding effect on the parts since any additional friction may be compensated for by correspondingly increasing the spring tension at the roller 19.

Figure 11:
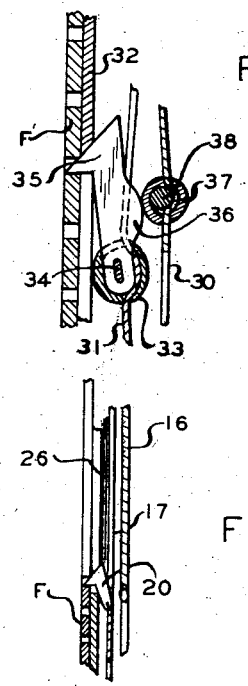
Fig. 11 shows a modification wherein the pawl is caused to engage the film perforations due to tension in the curtains and a special projection on the pawl.
Figure 12:
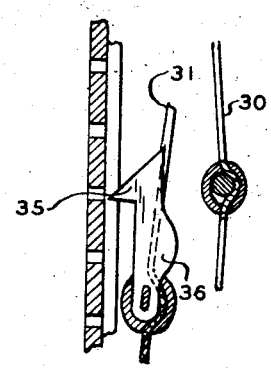
Fig. 12 shows the mechanism of Fig. 11 just after the first curtain has been released thereby withdrawing the pawl from engagement with the film.

Now referring to Figs. 11 and 12, a modification will be described which is very similar to the form just above described and illustrated in Figs. 1–10, but differing in that no baffles are required. The curtains 30 and 31 correspond to curtains 16 and 17 and the film F is guided by corresponding elements including a gate plate 32. The curtain 31 is provided with a reenforcing strip 33 clamped about the edge of the exposure aperture therein. The strip has fixed therein a transverse spindle 34 which, contrary to the construction previously described, is rigidly held and is so disposed relatively to the length of the curtain that it tends to govern the position of pawls 35 and to retain them pointed in the direction of the curtain travel. The pawls 35 have cam lobes 36 projecting toward the first curtain 30. That first curtain has similar reenforcing strips 37 clamped thereabout, those strips being caused to assume a rounded or bulged form in the direction of the second curtain by the incorporation of a transverse pin or wire 38. During setting of the shutter, the film is advanced since the reenforcing strip at the curtains 30 aligns with the lobes 36 on the pawls so that, when the curtains are tensioned, the strip 37 pushes the hooked ends of the pawls against the film where they must naturally engage the perforations. After complete movement of the parts in the direction of setting, they move back through a short distance just as in the first described form of the invention. That permits the pawls to disengage the particular perforations they held while advancing the film and they may slip backwardly to the next perforation or may merely ride upon some part of the film between perforations. Upon release of the shutter, the first curtain moves in advance of the second so that engagement between the part 37 and the lobes 36 is discontinued and then, due to the natural tendency of the pawls to align with the direction of curtain travel as shown in Fig. 12, there will be no engagement of the pawls with the film during the shutter movement at exposure. Thus, this form of the invention functions in practically the same way as the first but does not require special controlling means such as the baffles 25 to prevent contact of the pawls with the film during the actual exposure period.

The invention has been described by reference to one particular embodiment thereof as applied to a typical 35 mm. still camera. It is obviously applicable to cameras of other types and sizes so long as the film is perforated for engagement by the pawls or equivalent claw-like instruments. There are many different forms which the shutter curtains themselves may take, and they may be made of fabric or metal in accordance with well known practice. The actual operation of the curtains and the timing thereof, is of course, varied for exposures of different duration, but at the critical points, the behavior of the first and second curtains will necessarily be substantially that herein described.

While one embodiment and a modification of the invention have been disclosed, it is to be understood that the inventive concept may be carried out in a number of ways. This invention is, therefore, not to be limited to the precise details described, but is intended to cover all variations and modifications thereof falling within the spirit of the invention and the scope of the claims.

I claim:

1. Film advancing means for cameras of the type employing perforated film and having a curtain type shutter which comprises a gate plate against which said film is guided and at the opposite side of which are operatively positioned the first and second curtains of the said shutter, slots in said gate plate aligned with the perforated edges of the film, film engaging pawls projecting through said slots and mounted on pivot means carried by the curtain nearest the film, the perforation engaging ends of said pawls being biased toward the film upon tension of said curtain, and a baffle at each side of said gate movable to and from a position between said slot in the gate and the adjacent curtain, each said baffle having a beveled end engageably by its respective pawl when the shutter is moved to tensioned position for moving the said baffles away from their position beneath the slots, said baffles upon return movement of the shutter for exposure, providing an engaging surface on which the pawls ride to prevent their contact with the film until the shutter has substantially reached its point of rest.

2. Film advancing means for cameras of the type employing perforated film and having a curtain type shutter which comprises a gate plate against which said film is guided and at the opposite side of which are operatively positioned the first and second curtains of the said shutter, slots in said gate plate aligned with the perforated edges of the film, film engaging pawls mounted on pivots located at either side of said first shutter curtain and affixed thereto, said pawls being in alignment with said slots and directed toward said film, a baffle at each side of said gate including a plate underlying each slot and spring means for urging said plate inwardly but permitting it to be forced outwardly away from said slot, one end of said plates having a beveled edge engageable by one of said pawls and by means of which the blade is cammed outwardly to permit the pawl to travel along the slot while in engagement with the film, each said pawl further having a beveled cam-like end engageable at the opposite end of said plate for causing it to be withdrawn from the film and to prevent contact between the pawl and the film during travel of the shutter curtain for effecting exposure.

3. Film advancing means for cameras of the type employing perforated film and having a curtain type shutter which comprises a gate plate against which said film is guided and at the opposite side of which are operatively positioned the first and second curtains of the said shutter, slots in said gate plate aligned with the perforated edges of the film, said first curtain adjacent the gate plate having a reenforcing strip at the transverse edge of the exposure opening therein, said reenforcing strip having loops within which are pivotally mounted film engaging pawls, said pawls being aligned with the said slots and having pawl-like ends for engagment with perforations in the film, baffle means including thin plates interposed between said gate plate and the shutter curtain adjacent that plate and projectable to and from positions in which they underlie the said slots, spring means for pressing said baffle means to a position to underlie said slots, each said baffle plate having a beveled end engageable by the film engaging pawl adjacent thereto to move the cam plate outwardly away from the slot during movement of the shutter in a direction to tension it and to advance the film, the other ends of said plates extending substantially transversely of the travel of said pawls for engagement therewith upon return movement of the shutter to withdraw the pawls from the film and to prevent engagement thereof with the film during exposure.

CARL H. JACOBSON.

REFERENCES CITED

The following references are of record in the file of this patent:

UNITED STATES PATENTS

| Number | Name | Date |
|---|---|---|
| 452,119 | Edwards | May 12, 1891 |
| 1,531,182 | Hartmann | Mar. 24, 1925 |
| 2,111,425 | Goldhammer | Mar. 15, 1938 |

FOREIGN PATENTS

| Number | Country | Date |
|---|---|---|
| 1,276 | Great Britain | of 1914 |
| 241,455 | Great Britain | Oct. 22, 1925 |